UNITED STATES PATENT OFFICE.

RAYMOND W. TUNNELL, OF PHILADELPHIA, PENNSYLVANIA.

VEGETABLE GLUE OR ADHESIVE.

1,248,039.

Specification of Letters Patent. Patented Nov. 27, 1917.

No Drawing. Application filed May 3, 1917. Serial No. 166,188.

*To all whom it may concern:*

Be it known that I, RAYMOND W. TUNNELL, a citizen of the United States, and a resident of Philadelphia, in the county of Philadelphia and State of Pennsylvania, have invented a new and Improved Vegetable Glue or Adhesive, of which the following is a full, clear, and exact description.

The object of the invention is to provide an improved adhesive suitable not only for laying wood veneers but for making satisfactory glued joint work, where the said adhesive can be applied mechanically to wooden joints.

My composition belongs to that large class of adhesives of vegetable origin produced from starch which has been modified or hydrolyzed by the action of acids or alkalis on the aqueous solution, preferably in the presence of heat. The resultant product is a degenerated starch glue with increased adhesiveness, and has been used in various forms and for various purposes for many years.

The object of my invention, however, is to greatly increase the binding power of all previously known starch glues and to produce a composition which will flow more easily, work better in veneering machines, produce a higher grade of work of more permanent character, and allow the product to be used for joint work, as well as veneer.

In my invention I make use of the old well-known methods of treating one of the many forms of starch from its various sources, such as tapioca, sago, or potatoes, or from other sources, in order to hydrolyze or convert such starch to the point of producing a density flow or viscosity of the degree desired. I follow former well-known methods in grinding, mixing or agitating the selected starch with enough water to produce a paste of the proper consistency, the percentage of water to starch varying with the source and characterisics of the latter.

When the paste solution has been brought to its proper consistency, I add to the same, as in previous well-known cases, the necessary percentage of caustic soda or other alkali to digest the starch or hydrolyze it. Thus far I claim no novelty. To this solution I then add from five to fifty per cent. of alum, as compared to the weight of the caustic soda used, the quantity of alum depending on the desired viscosity of the resulting product, the greater the addition of alum the higher the viscosity of the resulting product. In place of an alum ordinary aluminum sulfate may be used. The addition of alum to the paste solution in presence of caustic soda, for example, results in the formation of a sodium aluminate. The same result will be obtained with aluminum sulfate in an excess of caustic soda. The resulting product is a clear jelly-like paste ready for use. The consistency of same may be varied, if desired, by the addition of water.

The alkali aluminate may be prepared beforehand and added to the paste solution after the same has been treated with caustic alkali or acid, as the case may be, but which reacts alkaline.

In preparing the alkaline aluminate beforehand, to be added to the hydrolyzed starch, a predetermined quantity of potash aluminum or aluminum sulfate is treated with enough water to dissolve preferably with a slight application of heat. To this solution is added enough caustic alkali solution to redissolve the precipitated aluminum hydroxid first formed by the addition of the caustic. The resulting solution is necessarily alkaline in reaction and forms the reagent which reacts with the vegetable glue hydrolyzed in the well known manner. The advantage obtained from the addition of the alkali aluminate, preferably sodium aluminate or the formation of same in the paste by the addition of alum, is that it does not thicken or jelly the vegetable glue and render it almost unworkable, as would be the case with plumbates.

I claim:

1. The process of making adhesive from starch compounds comprising a step which consists in treating the hydrolyzed starch or its derivative with an alkaline aluminate.

2. The process of making adhesive from starch compounds comprising a step which consists in treating the hydrolyzed starch or its derivative with a sodium aluminate.

3. A process of making adhesive from starch compounds comprising a step which consists in treating the hydrolyzed starch or its derivative with alum in excess of caustic alkali to form an alkali aluminate in the hydrolyzed starch.

4. A process of making adhesive from starch compounds comprising a step which consists in treating the hydrolyzed starch or its derivative with alum in excess of caustic soda to form sodium aluminate in the hydrolyzed starch.

5. A process of making adhesive from starch compounds comprising a step which consists in treating the hydrolyzed starch or its derivative with an aluminum salt in excess of caustic alkali to form an alkali aluminate in the mixture.

6. An adhesive consisting of a hydrolyzed starch and an alkaline aluminate.

7. An adhesive consisting of hydrolyzed starch and a sodium aluminate.

8. An adhesive consisting of hydrolyzed starch reacted with alum in an excess of caustic alkali.

9. An adhesive consisting of hydrolyzed starch, an aluminum salt and an excess of caustic soda.

RAYMOND W. TUNNELL.